A. R. WALTY.
ICE BOX.
APPLICATION FILED JAN. 4, 1919.

1,314,108.

Patented Aug. 26, 1919.
2 SHEETS—SHEET 1.

INVENTOR
Arthur R. Walty
BY
ATTORNEY

A. R. WALTY.
ICE BOX.
APPLICATION FILED JAN. 4, 1919.

1,314,108.

Patented Aug. 26, 1919.
2 SHEETS—SHEET 2.

INVENTOR
Arthur R. Walty
BY
ATTORNEY

UNITED STATES PATENT OFFICE.

ARTHUR R. WALTY, OF NEW YORK, N. Y.

ICE-BOX.

1,314,108.  Specification of Letters Patent.  Patented Aug. 26, 1919.

Application filed January 4, 1919. Serial No. 269,600.

*To all whom it may concern:*

Be it known that I, ARTHUR R. WALTY, a citizen of the United States, and resident of the borough of Manhattan, in the city, county, and State of New York, have invented a new and useful Ice-Box, of which the following is a specification.

The invention relates to refrigerators of the ice-box type, such as are used particularly in hotels and restaurants, that is to say a chest with top lid, the interior of which forms a common ice and food chamber, and has for its object to obviate unsanitary conditions and to facilitate cleaning. To this end the ice and food chamber is provided with a false bottom, which is spaced from the true bottom, containing the drain, and with a clean-out door in its front wall between the floors. In this way, dirt from the ice or food is not permitted to collect in the food chamber, but passes down into the inter-floor space, which being unobstructed favors its continuous removal in the melting ice flow. Occasionally this operation can be supplemented, and the refrigerator as a whole flushed, by pouring water over the ice and down the walls. Removal of accumulations is effected through the door, without opening the top lid or disturbing the contents of the food and ice-chamber. In present ice-boxes effective cleaning can be accomplished only by opening the chamber and removing everything in it, and as this is laborious and the drainage is not free, it frequently results that the lower part of the food chamber contains an accumulation of filth. This unwholesome condition my invention overcomes.

A further object is to provide for a beneficial circulation in the interior of the box and for introduction of cleansing and disinfecting agencies into the inter-floor space. This is accomplished by means of air shafts extending along the inner sides of the box from points beneath the false bottom to points near the top of the chamber and beneath the lid.

In the accompanying drawings forming part hereof:

Figure 1:
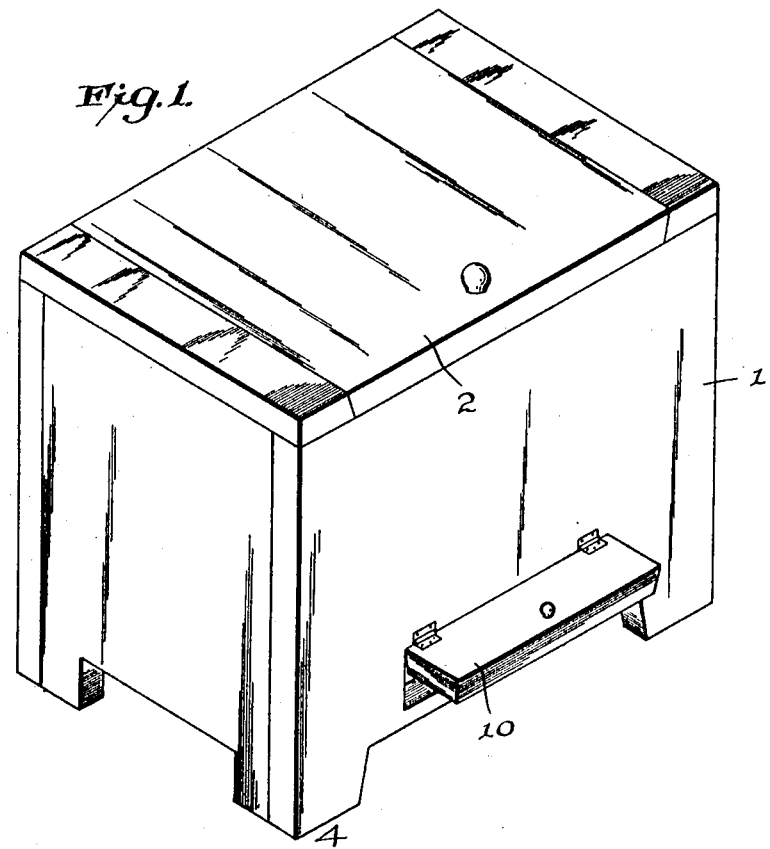
Figure 1 is a perspective view of the ice-box with the clean-out door partly open.
Figure 2:
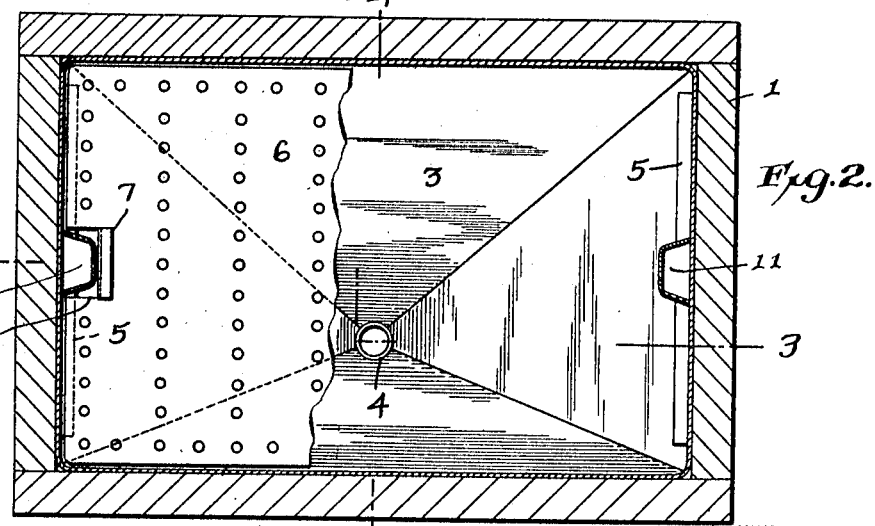
Fig. 2 is a sectional plan view.
Figure 4:
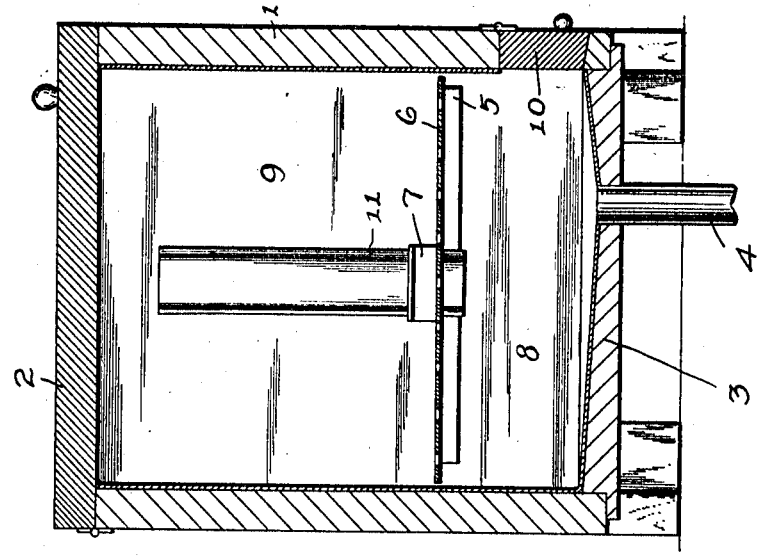
Fig. 4 is a vertical section at right-angles to Fig. 3, taken on the line 4—4 of Fig. 2.

The oblong chest 1 forming the ice-box, except as to the novel features herein pointed out, is to be understood as being constructed in accordance with approved practice. No attempt has been made to indicate heat insulation in the walls, because such matters are well understood and form no part of the invention. The hinged top lid 2 is as usual.

The true bottom 3 is, of course, watertight, and is provided with a drain 4, to which its lining preferably slopes from all directions.

A short distance above the true bottom, upon the inner faces of the side, or end, walls, ledges 5 are placed. These serve as supports for the false bottom 6, which is perforated or otherwise formed to permit the free escape of water and sediment. The false bottom is shown as a simple sheet, but obviously reinforcement can be secured by corrugating or otherwise, if desired. The false bottom preferably rests loosely on the ledges, so that it can be removed, for which purpose a lipped handle flange 7 may be bent up at one end.

Figure 3:
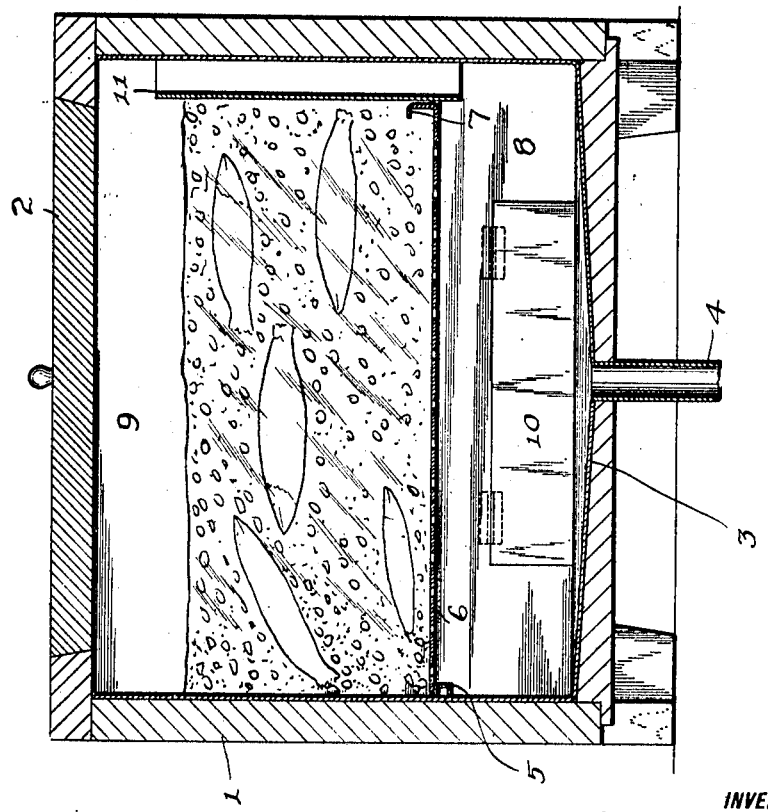
Fig. 3 is a vertical section, taken lengthwise of the box, on the angled line 3—3 of Fig. 2.

The false bottom constitutes the support for the ice and food, as indicated in Fig. 3, on the one hand keeping them off the drain floor, whereon a certain amount of sediment will collect, and on the other hand relieving this bottom of obstructions so that flushing either natural or artificial, will be more effective.

Naturally, the invention is not limited to the precise height of the inter-floor space or drainage chamber 8. It may be lower than shown, or higher if thought desirable, but in any event is low as compared with the food and ice-chamber 9. Its height is also such as to accommodate a horizontally elongated clean-out door 10 in the front wall, below the false bottom. This door when swung up affords ready access to all parts of the inter-floor space and the surfaces thereof, without throwing open the main chamber. As indicated, the drain floor may slope upward substantially flush with the lower side of the door-opening, thus making it easier to clean.

Air shafts 11, preferably constructed of sheet metal, are applied to the inner faces of the side, or end walls, intersecting the ledges 5 and passing through notches 12 in the false bottom 6. It is the material partially cut out from one of these notches which is utilized for the lifter 7. The upper and lower ends of said shafts are both open, their lower ends being below the false bottom and their upper ends near the top of the food and ice-chamber. These air shafts can also be used as channels for running cleansing or disinfecting liquids into the inter-floor space without disturbing the articles in the chamber.

What I claim as new is:

1. A refrigerator comprising a chest having a top lid and a drain at the bottom and the interior of which forms a food and ice chamber, a false bottom whereon the contents of said chamber rest, and beneath said false bottom a cleaning and drainage chamber, and a low horizontally elongated door in the lower part of the otherwise solid wall of the chest at the front of said cleaning and drainage chamber, whereby the refrigerator can be kept in sanitary condition by flushing through the top opening and removing deposits through the basal doorway, without removing the contents of the food and ice chamber.

2. A refrigerator as set forth in claim 1, further characterized by air shafts extending along the inner sides of the box from points below the false bottom to points in the upper part of the ice and food chamber beneath the top lid.

ARTHUR R. WALTY.

Copies of this patent may be obtained for five cents each, by addressing the "Commissioner of Patents, Washington, D. C."